US012785157B2

(12) United States Patent
Xu et al.

(10) Patent No.: US 12,785,157 B2
(45) Date of Patent: Nov. 3, 2026

(54) LITHIUM ION BATTERY WITH HIGH CAPACITY RETENTION RATE, AND PREPARATION METHOD AND CHARGING AND DISCHARGING METHODS THEREFOR

(71) Applicant: ZHEJIANG FUNLITHIUM NEW ENERGY TECH CO., LTD., Ningbo (CN)

(72) Inventors: Xiaoxiong Xu, Ningbo (CN); Yanming Cui, Ningbo (CN); Yuanqiao Huang, Ningbo (CN)

(73) Assignee: ZHEJIANG FUNLITHIUM NEW ENERGY TECH CO., LTD., Ningbo (CN)

( * ) Notice: Subject to any disclaimer, the term of this patent is extended or adjusted under 35 U.S.C. 154(b) by 1070 days.

(21) Appl. No.: 17/438,318

(22) PCT Filed: Jun. 22, 2019

(86) PCT No.: PCT/CN2019/092435
§ 371 (c)(1),
(2) Date: Sep. 10, 2021

(87) PCT Pub. No.: WO2020/215472
PCT Pub. Date: Oct. 29, 2020

(65) Prior Publication Data
US 2022/0190397 A1 Jun. 16, 2022

(30) Foreign Application Priority Data
Apr. 25, 2019 (CN) ........................ 201910338139.X

(51) Int. Cl.

| | |
|---|---|
| ***H01M 10/42*** | (2006.01) |
| ***H01M 4/02*** | (2006.01) |
| ***H01M 4/133*** | (2010.01) |
| ***H01M 4/134*** | (2010.01) |
| ***H01M 10/0525*** | (2010.01) |
| ***H01M 10/44*** | (2006.01) |

(52) U.S. Cl.
CPC ....... *H01M 10/4242* (2013.01); *H01M 4/133* (2013.01); *H01M 4/134* (2013.01); *H01M 10/0525* (2013.01); *H01M 10/44* (2013.01); *H01M 2004/021* (2013.01); *H01M 2004/027* (2013.01); *H01M 2004/028* (2013.01)

(58) Field of Classification Search
None
See application file for complete search history.

(56) References Cited

U.S. PATENT DOCUMENTS

2012/0064398 A1* 3/2012 Kim ...................... H01M 4/625
429/209
2018/0074130 A1* 3/2018 Jeung .................. G01R 31/396
2019/0177171 A1* 6/2019 Troegel ................ H01M 4/625

FOREIGN PATENT DOCUMENTS

JP 2015111656 A * 6/2015 ............. Y02E 60/10

OTHER PUBLICATIONS

Machine Translation of Nobuo (Year: 2015).*

* cited by examiner

*Primary Examiner* — Matthew T Martin
*Assistant Examiner* — Ankith R Sripathi
(74) *Attorney, Agent, or Firm* — Bayramoglu Law Offices LLC

(57) ABSTRACT

The invention relates to a lithium ion battery with a high capacity retention rate, and a preparation method and charging and discharging methods thereof. The lithium ion battery comprises a positive electrode plate, a negative electrode plate, separators arranged between the positive electrode plate and the negative electrode plate at intervals, and an electrolyte, and further comprises a third electrode and a fourth electrode, which are independent of each other and provided between the positive electrode plate and the negative electrode plate, wherein the third electrode and the fourth electrode are separated by means of a single-layer separator, a metal lithium electrode being used as the third electrode, and an activated carbon electrode being used as the fourth electrode. The third electrode and the fourth electrode cooperate with each other to realize supplementation of active lithium of a lithium ion battery at different stages by means of controlled use at different stages, thereby achieving repair and regeneration of the lithium ion battery, and finally, comprehensively increasing the long-cycle capacity retention rate of the current lithium ion battery, especially a solid-liquid lithium ion battery, and increasing the cruising ability retention rate of an electric vehicle.

3 Claims, No Drawings

LITHIUM ION BATTERY WITH HIGH CAPACITY RETENTION RATE, AND PREPARATION METHOD AND CHARGING AND DISCHARGING METHODS THEREFOR

TECHNICAL FIELD

The present invention relates to the technical field of lithium ion batteries, in particular to a lithium ion battery with a high capacity retention rate, and a preparation method and charging and discharging methods therefor.

BACKGROUND ART

With the introduction of the national new energy strategy policy, new energy electric vehicles have been developed rapidly. With regard to new energy vehicles, the personal experience of many buyers is that when they started driving, new energy vehicles are still good in terms of performance or cruising ability, but as the usage time becomes longer, many users will feel that the cruising abilities of new energy vehicles are significantly reduced.

As the power source of 3C products or the power of electric vehicles, in addition to energy density, another important indicator of lithium ion batteries is the capacity retention rate, which directly affects the feeling of using 3C products and the cruising abilities of electric vehicles. However, when a lithium ion battery is cycling, the negative SEI and the positive CEI are constantly destroyed and grown, and the active lithium in the positive electrode is constantly consumed, resulting in a continuous decrease of the available capacity of the battery, which directly leads to a significant decrease in the cruising ability of a battery.

With the increasing requirements on the specific energy of a power battery, the traditional graphite negative electrode material can no longer meet the requirements. In the development of a 300 Wh/kg high specific energy battery, the high nickel ternary+silicon carbon negative electrode material will become the mainstream material system of a power battery. The theoretical specific capacity of a Si material is as high as 4200 m Ah/g, but the volume expansion is as high as 300% during lithium intercalation, which will lead to cracks in a SEI film formed on the surface of Si particles or other Si-based negative electrodes, resulting in a continuous consumption of the electrolyte and active lithium in the positive electrode.

At present, in order to improve the first effect of silicon-based high-capacity negative electrode materials, a large number of lithium supplement technologies have emerged, but they all have the following shortcomings: (1) the pre-lithiation degree is uncontrollable: Li dendrites will be formed if the pre-lithiation degree is too high or lithium metal is used for pre-lithiation; it is difficult to control the matching with the positive electrode material; the decomposition products of some positive or negative electrode pre-lithiation reagents may contain other inactive residual substances besides Li, thus reducing the energy density of the battery; (2) the pre-lithiation process is complex: the pre-lithiation process is less compatible with existing lithium battery production processes, some of which involve pre-assembly and disassembly of batteries, which makes the battery preparation process overly complex, and is basically unable to achieve automation of pre-lithiation, resulting in a high cost of pre-lithiation; although there are related patents, the pre-lithiation process has not yet been applied in actual production; (3) poor uniformity of lithium supplementation: Li powder is sprayed on the negative electrode surface by means of electrostatic control. Since Li powder is relatively light and has a large specific surface area, resulting in the problems of how to control accurate lithium supplementation and unable to achieve uniform lithium supplementation. And the high activity of the lithium powder and environmental control are also important issues; and (4) easy deposition of dendrites; the negative electrode surface is covered with a layer of supplemented lithium with Li metal. If the lithium is excessive, there is a risk that lithium dendrites will be deposited on the surface of the lithium foil during subsequent charging, so ultra-thin lithium is needed. However, because lithium itself is relatively soft, high production requirements and high cost will be proposed if pressed into a very thin thickness. Moreover, the existing lithium supplement technology is mainly used to pre-compensate the active lithium lost in the first cycle of charge and discharge, which is only effective for the first cycle efficiency of lithium ion batteries, and has no obvious positive effect on the capacity attenuation in the later long cycle. Once the capacity attenuation of lithium ion batteries occurs after the first cycle, the conventional lithium ion battery technology is irreversible and the batteries cannot be repaired until being scrapped.

SUMMARY OF THE INVENTION

The objective of the present invention is to provide a lithium ion battery with a high capacity retention rate, and a preparation method and charging and discharging methods thereof. The lithium ion battery has repairable capability to a certain extent, so as to improve the long-cycle capacity retention rate of current lithium ion batteries, especially solid-liquid lithium ion batteries, and improve the cruising ability retention rate of electric vehicles, which is of great significance for reducing battery replacement frequency, reducing the usage cost of electric vehicles and promoting the popularization and application of electric vehicles.

The first objective of the present invention is achieved by the following technical solution:

a lithium ion battery with a high capacity retention rate, which comprises a positive electrode plate, a negative electrode plate, separators arranged between the positive electrode plate and the negative electrode plate at intervals, and an electrolyte, and further comprises a third electrode and a fourth electrode, which are provided between the positive electrode plate and the negative electrode plate, wherein the third electrode and the fourth electrode are separated by means of a single-layer separator, a metal lithium electrode being used as the third electrode, and an activated carbon electrode being used as the fourth electrode.

According to the above technical solution, the capacity retention rate of the lithium ion battery of the present application is remarkably improved by using four electrodes; in particular, the third electrode and the fourth electrode cooperate with each other to temporarily store active lithium, realizing quantitative timing and controllable restoration and regeneration of supplemented active lithium, and maintaining a good dynamic performance, such that the lithium ion battery has repairable ability to a certain extent, so as to realize the controllable and steady improvement of the long-cycle capacity retention rate of current lithium ion batteries, especially solid-liquid lithium ion batteries, and improve the cruising ability retention rate of electric vehicles. In addition, there is a natural potential difference between the fourth electrode and the negative electrode plate, which realizes the preferential removal of active lithium in the negative electrode of the lithium ion battery, and effectively avoids the problems of short circuit, failure and even safety of the lithium ion battery caused by the precipitation of lithium in a metal form due to the excessive active lithium in the negative electrode of the fourth electrode during subsequent charging.

The present invention is further provided as follows: the third electrode is preferably a lithium foil or a lithium alloy foil with a thickness of 100-500 μm.

According to the above technical solution, the thickness of the third electrode can be selected according to actual needs and cost. In addition, the thickness of the selected lithium foil or lithium alloy foil does not need to be too thin, which reduces the processing cost.

The present invention is further provided as follows: the lithium foil or lithium alloy foil is roughened by means of pre-rolling, and the pre-rolling is preformed by using a stainless steel roller with grid raised points, wherein the rolling pressure is 0.1-10 MPa.

According to the above technical solution, the metal lithium electrode after the roughening treatment has a microporous structure on the surface, which is conducive to electrolyte infiltration and shortens the repair and regeneration time.

The present invention is further provided as follows: the fourth electrode comprises the following components in percentage by weight: 35-55% of activated carbon, 40-55% of hard carbon, 5% of a binder, 4% of a conductive agent, 1% of a pore former, combined with a porous current collector.

According to the above technical solution, activated carbon, hard carbon, and the porous current collector can be used as the fourth electrode, which can realize the temporary storage of active lithium, and the repair and regeneration by using active lithium, thereby maintaining the dynamic performance of the lithium ion battery.

The present invention is further provided as follows: the number of layers of the third electrode and the fourth electrode is 1 to 4.

According to the above technical solution, the number of layers can be flexibly selected, and manufacturers can flexibly adjust the number of layers of the third electrode and the fourth electrode according to needs, in order to prepare lithium ion batteries with a balance of energy density and capacity retention rate under their own conditions.

The second objective of the present invention is achieved by the following technical solution:

a preparation method of the lithium ion battery with a high capacity retention rate, wherein the lithium ion battery is prepared by the following steps:

(1) the positive electrode plate, the negative electrode plate, and the separator are wound or laminated according to a conventional process to form a battery cell structure;

(2) the third electrode and the fourth electrode are wound or laminated inside or outside the above-mentioned battery cell structure, and the third electrode and the fourth electrode are separated by a single-layer separator; and (3) the electrolyte is injected according to conventional subsequent steps, and sealed to form the lithium ion battery.

According to the above technical solution, the preparation method of the present application is slightly improved on the basis of the original lithium ion battery production process, which helps to realize batch automated production. The preparation method are well adaptable, and can be applied to both the winding process and the lamination process.

The third objective of the present invention is achieved by the following technical solution:

charging and discharging methods of the lithium ion battery, which comprise the following steps:

(1) when the number of turns is n, the negative and positive electrodes of the lithium ion battery are only charged; after the charging is finished, the third electrode and the fourth electrode are discharged with controlled current;

(2) after standing for 1 hour, the fourth electrode is connected in parallel with the negative electrode of the lithium ion battery to perform the discharge with the positive electrode of the lithium-ion battery;

(3) the normal charge and discharge between the positive and negative electrodes of the lithium ion battery occur at the (n+1) th and subsequent turns;

(4) the normal charge and discharge are continued until the next fixed number of turns or conditional number of turns, and steps (1) to (4) are repeated; and (5) when the number of cycles reaches the specified number of turns, the charging and discharging methods are finished;

wherein the number of turns n may be a fixed number of turns or a conditional number of turns, and the fixed number of turns is preferably 300, 500, 700, 1000, 1300, 1500, 1800, 2000, 2500, 3000, 3500, 4000, 4500, or 5000.

According to the above technical solution, the metal lithium electrode only has a discharge process, which has low requirements on the environment, and since there is no charging process, no lithium dendrites are generated, which solves the safety problems in the use of conventional lithium metal; accurate control can be realized, which can not only realize regular repair according to the fixed number of turns, but also regeneration as needed according to the attenuation of actual capacity; and the uniform dispersion of active lithium in the lithium ion battery can be further promoted after standing for an appropriate period of time.

The present invention is further provided as follows: in the step (1), the third electrode and the fourth electrode are discharged, preferably at a discharge current of 0.05 A-2 A and preferably under a discharge cutoff condition, wherein the preferred discharge cut-off voltage is 2.3-2.9 V, and the discharge cut-off time is 1 min-30 min.

According to the above technical solution, the discharge time, discharge cut-off voltage and discharge current of the third electrode and the fourth electrode are controlled, so as to realize accurate and quantitative supplement of active lithium.

The present invention is further provided as follows: in the step (2), the fourth electrode is connected in parallel with the negative electrode of the lithium ion battery to perform the discharge with the positive electrode of the lithium-ion battery, wherein the discharge cut-off voltage is 2.3-2.9 V.

According to the above technical solution, the accurate and quantitative supplement of active lithium can be realized.

In summary, the beneficial technical effects of the present invention are as follows:

1. The synergy of the third electrode and the fourth electrode significantly improves the capacity retention rate of the lithium ion battery.
2. Activated carbon is used as the fourth electrode and provides efficient temporary storage of active lithium, and a porous current collector electrode, which maintains good kinetic performance during the repairing, regenerating and supplementing active lithium.

3. There is a natural potential difference between the fourth electrode and the negative electrode plate, which realizes the preferential removal of active lithium in the negative electrode of the lithium ion battery, and effectively avoids the precipitation of lithium in a metal form due to the excessive active lithium in the negative electrode of the fourth electrode during subsequent charging.
4. The original production process of the lithium ion battery is basically not changed, and only a slight improvement is required in the original production process, which helps to realize batch automated production.
5. The preparation method are well adaptable, and can be applied to both the winding process and the lamination process.
6. The metal lithium electrode only has a discharge process, which has low requirements on the environment, and since there is no charging process, no lithium dendrites are generated, which solves the safety problems in the use of conventional lithium metal.
7. The thickness of the third electrode can be selected according to actual needs and cost, and the thickness does not need to be too thin, which reduces the processing cost.
8. After the roughening treatment of the metal lithium electrode, the third electrode has a microporous structure on the surface, which is conducive to electrolyte infiltration and shortens the repair and regeneration time.
9. Accurate control can be realized: that is, regular repair can be performed according to the fixed number of turns.
10. The discharge time, discharge cut-off voltage and current of the third electrode and the fourth electrode, and the cut-off voltage at which the fourth electrode is connected in parallel with the negative electrode of the lithium ion battery to perform the regular discharge with the positive electrode of the lithium-ion battery are controlled, so as to realize accurate and quantitative supplement of active lithium;
11. The uniform dispersion of active lithium in the battery can be further promoted after standing for an appropriate period of time;
12. Manufacturers can adjust the shapes, thicknesses, numbers of layers, positions, specific formula compositions and numbers of working cycles of the third electrode and the fourth electrode according to the characteristics and production processes of the positive and negative electrode materials of the lithium ion batteries themselves, so as to obtain lithium ion batteries which adapt to their own conditions and have a balance of energy density and capacity retention rate.

DETAILED DESCRIPTION OF EMBODIMENTS

The present invention is further described in detail below in combination with examples.

Example I

A lithium ion battery with a high capacity retention rate, the preparation method and charging and discharging methods thereof comprise the following steps:

(1) Providing a graphite negative electrode, a NCM111 positive electrode, and a separator of the lithium ion battery, and laminating them according to a conventional process.

(2) Providing a lithium foil with a thickness of 100 μm, which is roughened by using a stainless steel roller with a roughness of 100 meshes at a rolling pressure of 10 MPa as a third electrode; wet mixing 50% of activated carbon, 40% of hard carbon, 5% of P VDF, 4% of acetylene black, 1% of $Li_2SO_4$ and foam nickel, rolling and drying same to obtain a fourth electrode, laminating one layer of the third electrode and one layer of the fourth electrode on both sides of the above battery cell, respectively, with a separator therebetween for separation. The negative electrode tabs of the lithium ion battery are ultrasonically spot-welded together and led out from the outer tab, the positive electrode tabs of the lithium ion battery are ultrasonically spot-welded together and led out from the outer tab, two lithium metal electrodes on both sides are calendered and bonded, and led out from the outer tab, and two fourth electrodes are ultrasonically spot-welded together and led out from the outer tab to form a lithium ion battery battery cell with four electrodes. After electrolyte injection, and pre-sealing, top sealing, side sealing and secondary sealing with aluminum plastic films, a lithium ion battery battery cell 10 Ah is formed.

(3) After the conventional formation, 10 charge and discharge cycle test is started on the battery with a voltage from 4.2 V-3 V, when the number of turns is 300, the lithium ion battery is charged between the negative and positive electrodes only and discharged at 0.05 A for 10 min between the third and fourth electrodes at the end of charging.

(4) Next, standing for 1 hour, the fourth electrode is connected in parallel with the negative electrode of the lithium ion battery to perform the 10 discharge with the positive electrode of the lithium-ion battery, wherein the discharge cut-off voltage is 2.9 V.

(5) The normal charge and discharge between the positive and negative electrodes of the lithium ion battery occur at the 301th-499th turns.

(6) When the number of turns is 500, the negative and positive electrodes of the lithium ion battery are only charged; after the charging is finished, the third electrode and the fourth electrode are discharged at 0.05 A for 20 min.

(7) Next, standing for 1 hour, the fourth electrode is connected in parallel with the negative electrode of the lithium ion battery to perform the discharge with the positive electrode of the lithium-ion battery, wherein the discharge cut-off voltage is 2.8 V.

(8) The normal charge and discharge between the positive and negative electrodes of the lithium ion battery occur at the 501th-699th turns.

(9) When the number of turns is 700, the negative and positive electrodes of the lithium ion battery are only charged; after the charging is finished, the third electrode and the fourth electrode are discharged at 0.05 A for 30 min.

(10) Next, standing for 1 hour, the fourth electrode is connected in parallel with the negative electrode of the lithium ion battery to perform the discharge with the positive electrode of the lithium-ion battery, wherein the discharge cut-off voltage is 2.7 V.

(11) The normal charge and discharge between the positive and negative electrodes of the lithium ion battery occur at the 701th-999th turns.

(12) When the number of turns is 1000, the negative and positive electrodes of the lithium ion battery are only charged; after the charging is finished, the third electrode and the fourth electrode are discharged at 0.1 A for 20 min.

(13) Next, standing for 1 hour, the fourth electrode is connected in parallel with the negative electrode of the lithium ion battery to perform the discharge with the positive electrode of the lithium-ion battery, wherein the discharge cut-off voltage is 2.6 V.

(14) The normal charge and discharge between the positive and negative electrodes of the lithium ion battery occur at the 1001th-1299th turns.

(15) When the number of turns is 1000, the negative and positive electrodes of the lithium ion battery are only charged; after the charging is finished, the third electrode and the fourth electrode are discharged at 1 A to 2.6 V.

(16) Next, standing for 1 hour, the fourth electrode is connected in parallel with the negative electrode of the lithium ion battery to perform the discharge with the positive electrode of the lithium-ion battery, wherein the discharge cut-off voltage is 2.5 V.

(17) The normal charge and discharge between the positive and negative electrodes of the lithium ion battery occur at the 1301th-1499th turns.

(18) When the number of turns is 1500, the negative and positive electrodes of the lithium ion battery are only charged; after the charging is finished, the third electrode and the fourth electrode are discharged at 2 A to 2.5 V.

(19) Next, standing for 1 hour, the fourth electrode is connected in parallel with the negative electrode of the lithium ion battery to perform the discharge with the positive electrode of the lithium-ion battery, wherein the discharge cut-off voltage is 2.5 V.

(20) The normal charge and discharge between the positive and negative electrodes of the lithium ion battery occur at the 1501th-2000th turns.

(21) When the 2000th turn is reached, the discharge is over, and the discharge capacity retention rate is calculated.

Example II

A lithium ion battery with a high capacity retention rate, the preparation method and charging and discharging methods therefor comprise the following steps:

(1) Providing a graphite negative electrode, a NC A positive electrode, and a separator of the lithium ion battery, and laminating them according to a conventional process.

(2) Providing a lithium foil with a thickness of 100 μm, which is roughened by using a stainless steel roller with a roughness of 500 meshes at a rolling pressure of 0.1 MPa as a third electrode; wet mixing 50% of activated carbon, 40% of hard carbon, 5% of P VDF, 4% of acetylene black, 1% of $Li_2SO_4$ and foam nickel, rolling and drying same to obtain a fourth electrode, laminating one layer of the third electrode and one layer of the fourth electrode on both sides of the above battery cell, respectively, with a separator therebetween for separation; the negative electrode tabs of the lithium ion battery are ultrasonically spot-welded together and led out from the outer tab, the positive electrode tabs of the lithium ion battery are ultrasonically spot-welded together and led out from the outer tab, two lithium metal electrodes on both sides are calendered and bonded, and led out from the outer tab, and two fourth electrodes are ultrasonically spot-welded together and led out from the outer tab to form a lithium ion battery battery cell with four electrodes. After electrolyte injection, and pre-sealing, top sealing, side sealing and secondary sealing with aluminum plastic films, a lithium ion battery battery cell 10 Ah is formed.

(3) After the conventional formation, 10 charge and discharge cycle test is started on the battery with a voltage from 4.2 V-3 V, when the number of turns is 300, the lithium ion battery is charged between the negative and positive electrodes only and discharged at 0.05 A for 10 min between the third and fourth electrodes at the end of charging.

(4) Next, standing for 1 hour, the fourth electrode is connected in parallel with the negative electrode of the lithium ion battery to perform the discharge with the positive electrode of the lithium-ion battery, wherein the discharge cut-off voltage is 2.9 V.

(5) The normal charge and discharge between the positive and negative electrodes of the lithium ion battery occur at the 301th-499th turns.

(6) When the number of turns is 500, the negative and positive electrodes of the lithium ion battery are only charged; after the charging is finished, the third electrode and the fourth electrode are discharged at 0.05 A for 20 min.

(7) Next, standing for 1 hour, the fourth electrode is connected in parallel with the negative electrode of the lithium ion battery to perform the discharge with the positive electrode of the lithium-ion battery, wherein the discharge cut-off voltage is 2.8 V.

(8) The normal charge and discharge between the positive and negative electrodes of the lithium ion battery occur at the 501th-699th turns.

(9) When the number of turns is 700, the negative and positive electrodes of the lithium ion battery are only charged; after the charging is finished, the third electrode and the fourth electrode are discharged at 0.05 A for 30 min.

(10) Next, standing for 1 hour, the fourth electrode is connected in parallel with the negative electrode of the lithium ion battery to perform the discharge with the positive electrode of the lithium-ion battery, wherein the discharge cut-off voltage is 2.7 V.

(11) The normal charge and discharge between the positive and negative electrodes of the lithium ion battery occur at the 701th-999th turns.

(12) When the number of turns is 1000, the negative and positive electrodes of the lithium ion battery are only charged; after the charging is finished, the third electrode and the fourth electrode are discharged at 0.1 A for 20 min.

(13) Next, standing for 1 hour, the fourth electrode is connected in parallel with the negative electrode of the lithium ion battery to perform the discharge with the positive electrode of the lithium-ion battery, wherein the discharge cut-off voltage is 2.6 V.

(14) The normal charge and discharge between the positive and negative electrodes of the lithium ion battery occur at the 1001th-1299th turns.

(15) When the number of turns is 1000, the negative and positive electrodes of the lithium ion battery are only charged; after the charging is finished, the third electrode and the fourth electrode are discharged at 1 A to 2.6 V.

(16) Next, standing for 1 hour, the fourth electrode is connected in parallel with the negative electrode of the lithium ion battery to perform the discharge with the positive electrode of the lithium-ion battery, wherein the discharge cut-off voltage is 2.5 V.

(17) The normal charge and discharge between the positive and negative electrodes of the lithium ion battery occur at the 1301th-1499th turns.

(18) When the number of turns is 1500, the negative and positive electrodes of the lithium ion battery are only charged; after the charging is finished, the third electrode and the fourth electrode are discharged at 2 A to 2.5 V.

(19) Next, standing for 1 hour, the fourth electrode is connected in parallel with the negative electrode of the lithium ion battery to perform the discharge with the positive electrode of the lithium-ion battery, wherein the discharge cut-off voltage is 2.5 V.

(20) The normal charge and discharge between the positive and negative electrodes of the lithium ion battery occur at the 1501th-2000th turns.

(21) When the 2000th turn is reached, the discharge is over, and the discharge capacity retention rate is calculated.

Example III

A lithium ion battery with a high capacity retention rate, the preparation method and charging and discharging methods therefor comprise the following steps:

(1) Providing a silicon carbon negative electrode, a NCM523 positive electrode, and a separator of the lithium ion battery, and laminating them according to a conventional process.

(2) Providing a lithium foil with a thickness of 200 μm, which is roughened by using a stainless steel roller with a roughness of 300 meshes at a rolling pressure of 1 MPa as a third electrode; wet mixing 35% of activated carbon, 55% of hard carbon, 5% of P VDF, 4% of acetylene black, 1% of $Li_2SO_4$ and foam nickel, rolling and drying same to obtain a fourth electrode, laminating two layers of the lithium foil and two layers of the activated carbon electrode at the center of the above battery cell, respectively, with a separator therebetween for separation; the negative electrode tabs of the lithium ion battery are ultrasonically spot-welded together and led out from the outer tab, the positive electrode tabs of the lithium ion battery are ultrasonically spot-welded together and led out from the outer tab, two lithium metal electrodes on both sides are calendered and bonded and led out from the outer tab, and two fourth electrodes are ultrasonically spot-welded together and led out from the outer tab to form a lithium ion battery battery cell with four electrodes. After electrolyte injection, and pre-sealing, top sealing, side sealing and secondary sealing with aluminum plastic films, a lithium ion battery battery cell 40 Ah is formed.

(3) After the conventional formation, 10 charge and discharge cycle test is started on the battery with a voltage from 4.2 V-3 V, when the number of turns is 300, the lithium ion battery is charged between the negative and positive electrodes only and discharged at 2 A to 2.9 V between the third and fourth electrodes at the end of charging.

(4) Next, standing for 1 hour, the fourth electrode is connected in parallel with the negative electrode of the lithium ion battery to perform the discharge with the positive electrode of the lithium-ion battery, wherein the discharge cut-off voltage is 2.8 V.

(5) The normal charge and discharge between the positive and negative electrodes of the lithium ion battery occur at the 301th-499th turns.

(6) When the number of turns is 500, the negative and positive electrodes of the lithium ion battery are only charged; after the charging is finished, the third electrode and the fourth electrode are discharged at 2 A to 2.8 V.

(7) Next, standing for 1 hour, the fourth electrode is connected in parallel with the negative electrode of the lithium ion battery to perform the discharge with the positive electrode of the lithium-ion battery, wherein the discharge cut-off voltage is 2.7 V.

(8) The normal charge and discharge between the positive and negative electrodes of the lithium ion battery occur at the 501th-699th turns.

(9) When the number of turns is 700, the negative and positive electrodes of the lithium ion battery are only charged; after the charging is finished, the third electrode and the fourth electrode are discharged at 2 A to 2.7 V.

(10) Next, standing for 1 hour, the fourth electrode is connected in parallel with the negative electrode of the lithium ion battery to perform the discharge with the positive electrode of the lithium-ion battery, wherein the discharge cut-off voltage is 2.6 V.

(11) The normal charge and discharge between the positive and negative electrodes of the lithium ion battery occur at the 701th-999th turns.

(12) When the number of turns is 1000, the negative and positive electrodes of the lithium ion battery are only charged; after the charging is finished, the third electrode and the fourth electrode are discharged at 2 A to 2.6 V.

(13) Next, standing for 1 hour, the fourth electrode is connected in parallel with the negative electrode of the lithium ion battery to perform the discharge with the positive electrode of the lithium-ion battery, wherein the discharge cut-off voltage is 2.55 V.

(14) The normal charge and discharge between the positive and negative electrodes of the lithium ion battery occur at the 1001th-1449th turns.

(15) When the number of turns is 1500, the negative and positive electrodes of the lithium ion battery are only charged; after the charging is finished, the third electrode and the fourth electrode are discharged at 2 A to 2.6 V.

(16) Next, standing for 1 hour, the fourth electrode is connected in parallel with the negative electrode of the lithium ion battery to perform the discharge with the positive electrode of the lithium-ion battery, wherein the discharge cut-off voltage is 2.5 V.

(17) The normal charge and discharge between the positive and negative electrodes of the lithium ion battery occur at the 1501th-1799th turns.

(18) When the number of turns is 1800, the negative and positive electrodes of the lithium ion battery are only charged; after the charging is finished, the third electrode and the fourth electrode are discharged at 2 A to 2.5 V.

(19) Next, standing for 1 hour, the fourth electrode is connected in parallel with the negative electrode of the lithium ion battery to perform the discharge with the positive electrode of the lithium-ion battery, wherein the discharge cut-off voltage is 2.5 V.

(20) The 1801th-2000th turns are the normal charge and discharge between the positive and negative electrodes of the lithium ion battery, and when the 2000th turn is reached, the discharge is over, and the discharge capacity retention rate is calculated.

Example IV

A lithium ion battery with a high capacity retention rate, the preparation method and charging and discharging methods therefor comprise the following steps:

(1) Providing a graphite negative electrode, a $LiFePO_4$ positive electrode, and a separator of the lithium ion battery, and winding them according to a conventional process.

(2) Providing a lithium foil with a thickness of 200 μm, which is roughened by using a stainless steel roller with a roughness of 200 meshes as a third electrode; wet mixing 50% of activated carbon, 40% of hard carbon, 5% of P VDF, 4% of acetylene black, 1% of $Li_2SO_4$ and stainless steel mesh, rolling and drying same to obtain a fourth electrode, winding one layer of the lithium foil and one layer of the activated carbon electrode outside the above battery cell, with a separator therebetween for separation; the negative electrode tabs of the lithium ion battery are ultrasonically spot-welded and led out from the outer tab, the positive electrode tabs of the lithium ion battery are ultrasonically spot-welded and led out from the outer tab, a single layer of lithium metal electrode is calendered and bonded, and led out from the outer tab, and a single layer of the fourth electrode is ultrasonically spot-welded and led out from the outer tab to form a lithium ion battery battery cell with four electrodes. Placing the lithium ion battery into an aluminum shell, injecting an electrolyte, and sealing same to form a lithium ion battery battery cell 20 Ah.

(3) After the conventional formation, 10 charge and discharge cycle test is started on the battery with a voltage from 3.9 V to 2.5 V, when the number of turns is 500, the lithium ion battery is charged between the negative and positive electrodes only and discharged at 0.5 A for 1 min between the third and fourth electrodes at the end of charging.

(4) Next, standing for 1 hour, the fourth electrode is connected in parallel with the negative electrode of the lithium ion battery to perform the discharge with the positive electrode of the lithium-ion battery, wherein the discharge cut-off voltage is 2.9 V.

(5) The normal charge and discharge between the positive and negative electrodes of the lithium ion battery occur at the 501th-999th turns.

(6) When the number of turns is 1000, the negative and positive electrodes of the lithium ion battery are only charged; after the charging is finished, the third electrode and the fourth electrode are discharged at 0.5 A for 5 min.

(7) Next, standing for 1 hour, the fourth electrode is connected in parallel with the negative electrode of the lithium ion battery to perform the discharge with the positive electrode of the lithium-ion battery, wherein the discharge cut-off voltage is 2.85 V.

(8) The normal charge and discharge between the positive and negative electrodes of the lithium ion battery occur at the 1001th-1499th turns.

(9) When the number of turns is 1500, the negative and positive electrodes of the lithium ion battery are only charged; after the charging is finished, the third electrode and the fourth electrode are discharged at 0.05 A for 10 min.

(10) Next, standing for 1 hour, the fourth electrode is connected in parallel with the negative electrode of the lithium ion battery to perform the discharge with the positive electrode of the lithium-ion battery, wherein the discharge cut-off voltage is 2.8 V.

(11) The normal charge and discharge between the positive and negative electrodes of the lithium ion battery occur at the 1501th-1999th turns.

(12) When the number of turns is 2000, the negative and positive electrodes of the lithium ion battery are only charged; after the charging is finished, the third electrode and the fourth electrode are discharged at 0.5 A for 15 min.

(13) Next, standing for 1 hour, the fourth electrode is connected in parallel with the negative electrode of the lithium ion battery to perform the discharge with the positive electrode of the lithium-ion battery, wherein the discharge cut-off voltage is 2.75 V.

(14) The normal charge and discharge between the positive and negative electrodes of the lithium ion battery occur at the 2001th-2499th turns.

(15) When the number of turns is 2500, the negative and positive electrodes of the lithium ion battery are only charged; after the charging is finished, the third electrode and the fourth electrode are discharged at 0.5 A for 20 min.

(16) Next, standing for 1 hour, the fourth electrode is connected in parallel with the negative electrode of the lithium ion battery to perform the discharge with the positive electrode of the lithium-ion battery, wherein the discharge cut-off voltage is 2.7 V.

(17) The normal charge and discharge between the positive and negative electrodes of the lithium ion battery occur at the 2501th-2999th turns.

(18) When the number of turns is 3000, the negative and positive electrodes of the lithium ion battery are only charged; after the charging is finished, the third electrode and the fourth electrode are discharged at 0.5 A for 25 min.

(19) Next, standing for 1 hour, the fourth electrode is connected in parallel with the negative electrode of the lithium ion battery to perform the discharge with the positive electrode of the lithium-ion battery, wherein the discharge cut-off voltage is 2.65 V.

(20) the normal charge and discharge between the positive and negative electrodes of the lithium ion battery occur at the 3001th-3499th turns.

(21) When the 3500th turn is reached, the discharge is over, and the discharge capacity retention rate is calculated.

Example V

A lithium ion battery with a high capacity retention rate, the preparation method and charging and discharging methods therefor comprise the following steps:

(1) Providing a silicon carbon negative electrode, a $LiMnO_2$ positive electrode, and a separator of the lithium ion battery, and winding them according to a conventional process.

(2) Providing a lithium foil with a thickness of 500 μm, which is roughened by using a stainless steel roller with a roughness of 300 meshes at a rolling pressure of 10 MPa as a third electrode; wet mixing 35% of activated carbon, 55% of hard carbon, 5% of P VDF, 4% of acetylene black, 1% of $Li_2SO_4$ and foam nickel, rolling and drying same to obtain a fourth electrode. Before winding the silicon carbon negative electrode and $LiMnO_2$ positive electrode, the lithium metal negative electrode and the activated carbon electrode are wound at the center for two turns, with a separator therebetween for separation; the negative electrode tabs of the lithium ion battery are ultrasonically spot-welded and led out from the outer tab, the positive electrode tabs of the lithium ion battery are ultrasonically spot-welded and led out from the outer tab, a single layer of lithium metal electrode is calendered and bonded, and led out from the outer tab, and a single layer of the fourth electrode is ultrasonically spot-welded and led out from the outer tab to form a lithium ion battery battery cell with four electrodes. Placing the lithium ion battery into an aluminum shell, injecting an electrolyte, and sealing same to form a lithium ion battery battery cell 30 Ah.

(3) After the conventional formation, 10 charge and discharge cycle test is started on the battery with a voltage from 4.2 V-3 V, when the number of turns is 500, the lithium ion battery is charged between the negative and positive electrodes only and discharged at 0.5 A to a voltage of 3.0 V between the third and fourth electrodes at the end of charging.

(4) Next, standing for 1 hour, the fourth electrode is connected in parallel with the negative electrode of the lithium ion battery to perform the discharge with the positive electrode of the lithium-ion battery, wherein the discharge cut-off voltage is 2.9 V.

(5) The normal charge and discharge between the positive and negative electrodes of the lithium ion battery occur at the 501th-999th turns.

(6) When the number of turns is 1000, the negative and positive electrodes of the lithium ion battery are only charged; after the charging is finished, the third electrode and the fourth electrode are discharged at 0.5 A to 2.9 V of the cut-off voltage.

(7) Next, standing for 1 hour, the fourth electrode is connected in parallel with the negative electrode of the lithium ion battery to perform the discharge with the positive electrode of the lithium-ion battery, wherein the discharge cut-off voltage is 2.8 V.

(8) The normal charge and discharge between the positive and negative electrodes of the lithium ion battery occur at the 1001th-1299th turns.

(9) When the number of turns is 1300, the negative and positive electrodes of the lithium ion battery are only charged; after the charging is finished, the third electrode and the fourth electrode are discharged at 0.5 A to 2.8 V of the cut-off voltage.

(10) Next, standing for 1 hour, the fourth electrode is connected in parallel with the negative electrode of the lithium ion battery to perform the discharge with the positive electrode of the lithium-ion battery, wherein the discharge cut-off voltage is 2.7 V.

(11) The normal charge and discharge between the positive and negative electrodes of the lithium ion battery occur at the 1301th-1499th turns.

(12) When the number of turns is 1500, the negative and positive electrodes of the lithium ion battery are only charged; after the charging is finished, the third electrode and the fourth electrode are discharged at 0.5 A to 2.7 V of the cut-off voltage.

(13) Next, standing for 1 hour, the fourth electrode is connected in parallel with the negative electrode of the lithium ion battery to perform the discharge with the positive electrode of the lithium-ion battery, wherein the discharge cut-off voltage is 2.6 V.

(14) The normal charge and discharge between the positive and negative electrodes of the lithium ion battery occur at the 1501th-1799th turns.

(15) When the number of turns is 1800, the negative and positive electrodes of the lithium ion battery are only charged; after the charging is finished, the third electrode and the fourth electrode are discharged at 1 A to 2.6 V.

(16) Next, standing for 1 hour, the fourth electrode is connected in parallel with the negative electrode of the lithium ion battery to perform the discharge with the positive electrode of the lithium-ion battery, wherein the discharge cut-off voltage is 2.5 V.

(17) The normal charge and discharge between the positive and negative electrodes of the lithium ion battery occur at the 1801th-1999th turns.

(18) When the number of turns is 2000, the negative and positive electrodes of the lithium ion battery are only charged; after the charging is finished, the third electrode and the fourth electrode are discharged at 2 A to 2.5 V.

(19) Next, standing for 1 hour, the fourth electrode is connected in parallel with the negative electrode of the lithium ion battery to perform the discharge with the positive electrode of the lithium-ion battery, wherein the discharge cut-off voltage is 2.45 V.

(20) The normal charge and discharge between the positive and negative electrodes of the lithium ion battery occur at the 2001th-2499th turns.

(21) When the number of turns is 2500, the negative and positive electrodes of the lithium ion battery are only charged; after the charging is finished, the third electrode and the fourth electrode are discharged at 2 A to 2.4 V.

(22) Next, standing for 1 hour, the fourth electrode is connected in parallel with the negative electrode of the lithium ion battery to perform the discharge with the positive electrode of the lithium-ion battery, wherein the discharge cut-off voltage is 2.3 V.

(23) The 2501th-3000th turns are the normal charge and discharge between the positive and negative electrodes of the lithium ion battery, and when the 3000th turn is reached, the discharge is over, and the discharge capacity retention rate is calculated.

Comparative Example I

A lithium ion battery, the preparation method and charging and discharging methods therefor are as follows:

(1) Providing a graphite negative electrode, a NCM111 positive electrode, and a separator of the lithium ion battery, and laminating them according to a conventional process.

(2) After electrolyte injection, and pre-sealing, top sealing, side sealing and secondary sealing with aluminum plastic films, a lithium ion battery battery cell 10 Ah is formed.

(3) After the conventional formation, 1C charge and discharge cycle test is started on the battery with a voltage from 4.2 V-3 V. After 2000 cycles, the capacity retention rate of the lithium ion battery is calculated.

Comparative Example II

A lithium ion battery, the preparation method and charging and discharging methods therefor are as follows:

(1) Providing a graphite negative electrode, a NC A positive electrode, and a separator of the lithium ion battery, and laminating them according to a conventional process.

(2) After electrolyte injection, and pre-sealing, top sealing, side sealing and secondary sealing with aluminum plastic films, a lithium ion battery battery cell 10 Ah is formed.

(3) After the conventional formation, 10 charge and discharge cycle test is started on the battery with a voltage from 4.2 V-3 V. After 2000 cycles, the capacity retention rate of the lithium ion battery is calculated.

Comparative Example III

A lithium ion battery, the preparation method and charging and discharging methods therefor are as follows:

(1) Providing a silicon carbon negative electrode, a NCM523 positive electrode, and a separator of the lithium ion battery, and laminating them according to a conventional process.

(2) After electrolyte injection, and pre-sealing, top sealing, side sealing and secondary sealing with aluminum plastic films, a lithium ion battery battery cell 40 Ah is formed.

(3) After the conventional formation, 10 charge and discharge cycle test is started on the battery with a voltage from 4.2 V-3 V. After 2000 cycles, the capacity retention rate of the lithium ion battery is calculated.

Comparative Example IV

A lithium ion battery, the preparation method and charging and discharging methods therefor are as follows:

(1) Providing a graphite negative electrode, a $LiFePO_4$ positive electrode, and a separator of the lithium ion battery, and winding them according to a conventional process.

(2) Placing the lithium ion battery into an aluminum shell, injecting an electrolyte, and sealing same to form a lithium ion battery battery cell 20 Ah.

(3) After the conventional formation, 10 charge and discharge cycle test is started on the battery with a voltage from 3.9 V-2.5 V. After 3500 cycles, the capacity retention rate of the lithium ion battery is calculated.

Comparative Example V

A lithium ion battery, the preparation method and charging and discharging methods therefor are as follows:

(1) Providing a silicon carbon negative electrode, a $LiMnO_2$ positive electrode, and a separator of the lithium ion battery, and winding them according to a conventional process.

(2) Placing the lithium ion battery into an aluminum shell, injecting an electrolyte, and sealing same to form a lithium ion battery battery cell 30 Ah.

(3) After the conventional formation, 10 charge and discharge cycle test is started on the battery with a voltage from 4.2 V-3 V. After 3000 cycles, the capacity retention rate of the lithium ion battery is calculated.

Test method: the discharge capacity at the 3000th turn is divided by the discharge capacity of the first turn, and the instrument adopts the MEWARE charging and discharging cabinet.

Test Results:

| Sample | Capacity retention rate (%) |
|---|---|
| Example I | 94 |
| Example II | 92 |
| Example III | 93 |
| Example IV | 97 |
| Example V | 93 |
| Comparative example I | 80 |
| Comparative example II | 75 |
| Comparative example III | 65 |
| Comparative example IV | 85 |
| Comparative example V | 70 |

It can be seen from the above table that the capacity retention rates of the lithium ion batteries of the present application after a long cycle are all more than 90%, which is greater than that of the samples of the comparative examples, thus solving the problem of irreversible attenuation in the prior art.

The examples in the specific implementations are preferred examples of the present invention, and are not intended to limit the scope of protection of the present invention, and thus: equivalent changes made according to the structure, shape and principle of the present invention shall be contained within the scope of protection of the present invention.

What is claimed is:

1. A lithium ion battery with a high capacity retention rate, comprising a positive electrode plate, a negative electrode plate, wherein the negative electrode plate is a graphite negative electrode or a silicon carbon negative electrode, separators arranged between the positive electrode plate and the negative electrode plate, an electrolyte, at least one lithium foil or lithium alloy foil electrode, and at least one activated carbon electrode, wherein the at least one lithium foil or lithium alloy foil electrode and the at least one activated carbon electrode each have an independent terminal led out from the cell distinct from terminals of the positive electrode plate and the negative electrode plate; are provided between the positive electrode plate and the negative electrode plate; and are separated by means of a single-layer separator, wherein the at least one activated carbon electrode comprises 35-50% by weight of activated carbon, 40-55% by weight of hard carbon, 5% by weight of PVDF, 4% by weight of acetylene black, and 1% by weight of $Li_2SO_4$, and is made by wet mixing activated carbon, hard carbon, PVDF (polyvinylidene fluoride), acetylene black, $Li_2SO_4$ and foam nickel, then rolling and drying the same; and wherein there is a natural potential difference between the at least one activated carbon electrode and the negative electrode plate such that active lithium is preferentially removed from the negative electrode during subsequent charging;

thereby the lithium foil or lithium alloy foil electrode and the activated carbon electrode cooperate with each other to temporarily store active lithium, realizing quantitative timing and controllable restoration and regeneration of supplemented active lithium, and maintaining a good dynamic performance, such that the lithium ion battery has repairable ability to a certain extent, so as to realize a controllable and steady improvement of a long-cycle capacity retention rate of the lithium ion batteries.

2. The lithium ion battery with a high capacity retention rate according to claim 1, wherein the lithium foil or lithium alloy foil has a thickness of 100-500 μm.

3. The lithium ion battery with a high capacity retention rate according to claim 2, wherein the lithium foil or lithium alloy foil is roughened by means of pre-rolling, and the pre-rolling is preformed by using a stainless steel roller with grid raised points, wherein the rolling pressure is 0.1-10 MPa.

* * * * *